Jan. 23, 1962     A. CANDELISE     3,017,872
AIR INJECTION SYSTEM FOR AN INTERNAL COMBUSTION ENGINE
Filed March 4, 1960

INVENTOR.
Alfred Candelise
BY
ATTORNEY

3,017,872
AIR INJECTION SYSTEM FOR AN INTERNAL COMBUSTION ENGINE
Alfred Candelise, Flint, Mich., assignor to General Motors Corporation, Detroit, Mich., a corporation of Delaware
Filed Mar. 4, 1960, Ser. No. 12,858
1 Claim. (Cl. 123—26)

The invention relates to a system for injecting compressed air into the combustion chambers of an internal combustion engine in timed relation to the operation of the engine. It particularly concerns such a system in which the air for each combustion chamber is timed and distributed by a valve operating in timed relation with the engine and receiving a compressed air supply from a source powered by the engine. The air from the distribution and timing valve is introduced to each combustion chamber through flexible conduits connected with a passage extending through either the intake or exhaust valves for the cylinders. A ball check valve is positioned in the head of the cylinder valves at the air discharge point to prevent combustion gases from backing up into the supply conduits when the pressure in the combustion chambers are greater than the air pressures supplied.

A generally similar air injection system is disclosed and claimed in my co-pending application S.N. 12,857, filed March 4, 1960. An air timing and distribution valve such as is disclosed in that application may be utilized as a part of the system embodying the invention herein claimed.

Figure 1:
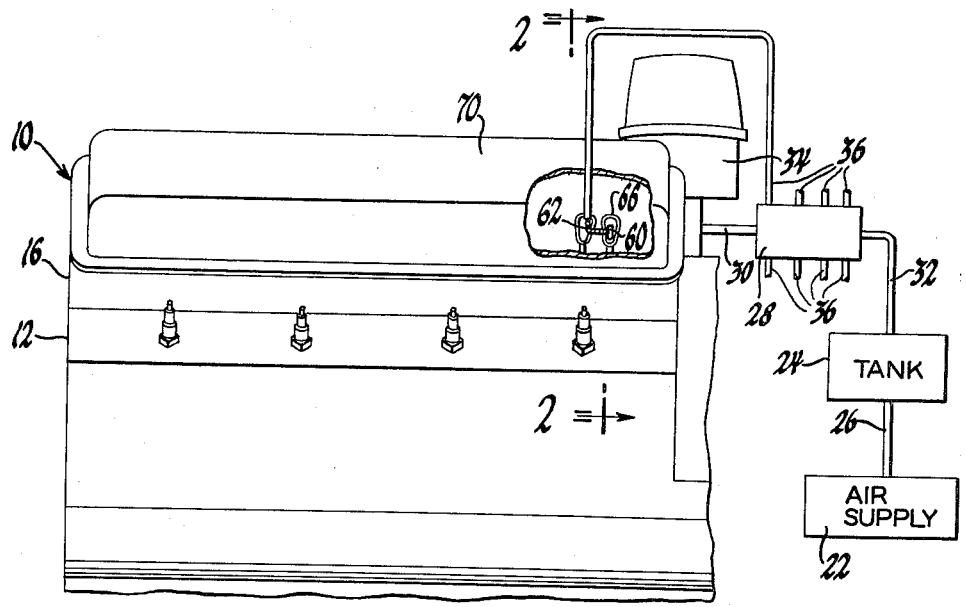

In the drawing:
FIGURE 1 is a schematic presentation of a system embodying the invention as installed on a V–8 type internal combustion engine, with parts of the engine being broken away and in section.

Figure 2:
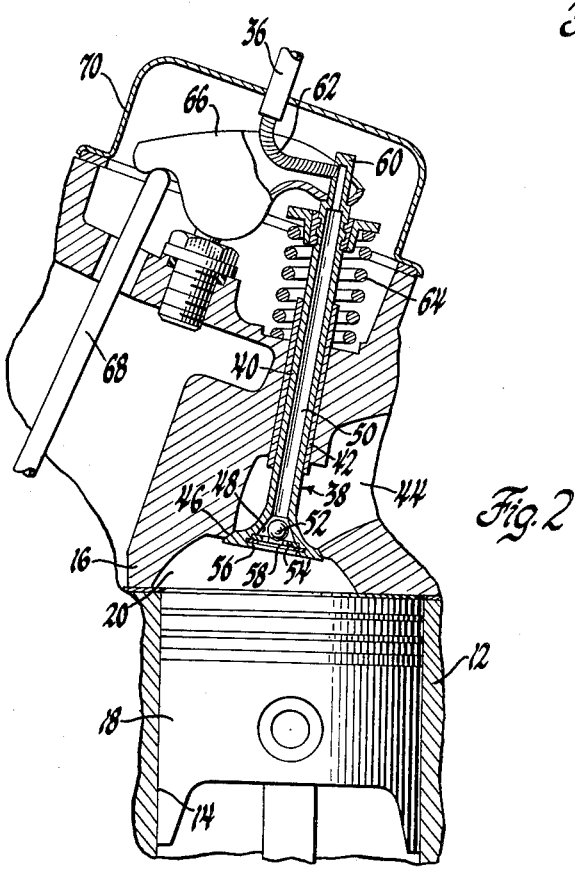

FIGURE 2 is a cross section view taken in the direction of arrows 2—2 of FIGURE 1 and showing one of the cylinders of the engine and the air injection means.

The system shown in FIGURE 1 is installed on the engine 10 which may be of the V–8 type having banks 12 of cylinders 14. A cylinder head 16 may be attached to each bank 12 and pistons 18 may be reciprocably mounted in cylinders 14. Combustion chambers 20 may be defined by the cylinder head 16, the cylinders 14 and the pistons 18.

The air supply 22 may be an air compressor driven by the engine 10 and having sufficient capacity to deliver air in the pressure range of 30 p.s.i. to 150 p.s.i. and in the rate range of 0.5 to 1 cubic foot per minute per engine cylinder when the engine is operating at idle and low speed conditions. Air may be supplied to tank 24 from the air supply 22 through conduit 26. An air timing and distribution valve 28 may be mounted adjacent engine 10 and have a driving member 30 attached to a portion of the engine which rotates in timed relation with the engine crankshaft so that the valve is operative to time and distribute air received from tank 24 to the various engine cylinders in time with the operation of the engine. It is preferable to introduce the air during the latter portion of the expansion stroke so that the previously unburned hydrocarbons may be burned before they are discharged to the exhaust system. A conduit 32 may connect tank 24 with valve 28. Valve 28 may be constructed in a manner similar to the air timing and distribution valve disclosed and claimed in my application referred to above and may operate in the same manner. It may be driven from the driving means for the engine distributor 34, if desired. Valve 28 has one discharge conduit for each cylinder of the engine 10, eight such conduits 36 being illustrated in this instance.

The means for introducing air to each of the combustion chambers includes one of the engine valves 38 which may be either the intake or exhaust valve and is illustrated in FIGURE 2 as being the exhaust valve. Valve 38 is provided with a hollow stem 40 received in valve guide 42 and extending through the exhaust passage 44 formed in the cylinder head 16 for delivering exhaust gases from the combustion chamber 20 to the engine exhaust system. The valve head 46 is also hollow and is preferably provided with an outwardly flared passage 48 which connects with the passage 50 in the hollow valve stem. Passage 48 provides a valve seat for the check valve 52 which is received within head 46. Valve 52 is retained within passage 48 by a steel retaining member 54 which is held in place by a snap ring 56. Retaining member 54 is annular in form and has an inner periphery with an inner diameter smaller than the diameter of the check valve 52. The retainer 54 may have circumferentially spaced notches 58 about its inner periphery which permit air to flow out of passage 48 while valve 52 is open and engages the retainer.

The upper end 60 of valve stem 40 is closed and a flexible conduit 62 is connected therewith so as to provide an air passage into stem passage 50. Conduit 62 is connected with discharge end of conduit 36 leading from valve 28 so that compressed air from valve 28 passes through the valve 38 to open check valve 52 and be discharged into the combustion chamber 20.

Valve 58 may be provided with the usual valve closing spring 64, valve rocker arm 66 and push rod 68 to open the valve during the exhaust stroke to permit the exhaust gases to be discharged in the combustion chamber. A rocker arm cover 70 may also be provided, if desired.

When air distribution and timing valve 28 permits compressed air to pass through conduit 36 and valve 38, the air acts against check valve 52 and tends to open that valve. If the gas pressures within combustion chamber 20 are greater than the compressed air pressure, the valve will remain closed. When the pressures within the combustion chamber decrease a sufficient amount, however, valve 52 will open under the influence of the compressed air pressure and the compressed air will be discharged through the valve head 46 and into the combustion chamber. The air will be mixed with the gases in that chamber and will permit the hydrocarbons which were previously unburned to be burned. The carbon monoxide content of the gases will be substantially eliminated and greater engine power will be realized. When the air is injected through the exhaust valve, it tends to cool that valve and promote longer valve life. If desired, however, the air may be injected through the intake valve and that valve will be cooled by the air.

What is claimed is:
Means for introducing compressed air into an internal combustion engine combustion chamber and comprising an engine valve normally operative to permit fluid flow into or out of the combustion chamber and having a tubular stem and a head secured to said stem, said head being provided with an outwardly flared passage con- necting with the interior of said stem and opening into the engine combustion chamber, flexible conduit means attached to the end of staid stem opposite said head and adapted to receive compressed air therethrough and discharge compressed air into said tubular stem, check valve means received in said head outwardly flared passage and movable to open and close said passage, and check valve retaining means secured in said head and positioned to retain said check valve within said passage and having passages formed therethrough permitting compressed air flow from said tubular stem and said flared passage around said check valve and into the combustion chamber when said check valve is open and permitting combustion gases to enter said flared passage and act on said check valve to close said check valve when combustion gas pressures exceed the air pressure in said tubular stem.

References Cited in the file of this patent

UNITED STATES PATENTS

| | | |
|---|---|---|
| 1,799,761 | Pew | Apr. 7, 1931 |
| 2,011,986 | Schwarz | Aug. 20, 1935 |
| 2,672,854 | Brubaker | Mar. 23, 1954 |
| 2,819,704 | Niederman | Jan. 14, 1958 |